US011451375B2

(12) United States Patent
Soundararajan et al.

(10) Patent No.: US 11,451,375 B2
(45) Date of Patent: Sep. 20, 2022

(54) SYSTEM, METHOD AND APPARATUS FOR PRIVACY PRESERVING INFERENCE

(71) Applicant: HUAWEI TECHNOLOGIES CO., LTD., Guangdong (CN)

(72) Inventors: Priya Soundararajan, Waterloo (CA); Zhijun Mo, Waterloo (CA); Zhiwei Shang, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 66 days.

(21) Appl. No.: 17/038,998

(22) Filed: Sep. 30, 2020

(65) Prior Publication Data

US 2022/0103346 A1    Mar. 31, 2022

(51) Int. Cl.
*H04L 9/06* (2006.01)
*G06N 3/08* (2006.01)
(Continued)

(52) U.S. Cl.
CPC .......... *H04L 9/0656* (2013.01); *G06F 21/602* (2013.01); *G06N 3/08* (2013.01); *G06N 20/00* (2019.01)

(58) Field of Classification Search
CPC ....... H04L 9/0656; G06F 21/602; G06N 3/08; G06N 20/00
See application file for complete search history.

(56) References Cited

U.S. PATENT DOCUMENTS

2014/0040172 A1* 2/2014 Ling .............. G06N 5/022
706/12
2019/0370434 A1* 12/2019 Sha ............... G06F 30/394
(Continued)

FOREIGN PATENT DOCUMENTS

CN    108449329 A    8/2018
CN    111243698 A    6/2020
(Continued)

OTHER PUBLICATIONS

Pinfer: Privacy-Preserving Inference for Machine Learning? Logistic Regression, Support Vector Machines, and More, Over Encrypted Data, arXiv:1910.01865v1 [cs.CR] Oct. 4, 2019 (Year: 2019).*
(Continued)

*Primary Examiner* — Meng Li
(74) *Attorney, Agent, or Firm* — BCF LLP

(57) ABSTRACT

The disclosed systems, and methods are directed to a method for Privacy Preserving Inference (PPI) comprising receiving a first set of matrix information from a client device, generating $k_c-1$ matrices by operating a first CSPRNG associated with the server with $k_c-1$ seeds, computing inferences from the set of $k_c$ matrices, generating a matrix $S_s$, generating $k_s-1$ random matrices, computing a matrix $Y_{k_s}$ in accordance with the inference matrix Y, the matrix $S_s$ and the $k_s-1$ random matrices, transmitting a second set of matrix information to the client device, the second set of matrix information includes $k_s-1$ seeds corresponding to the $k_s-1$ random matrices and the matrix $Y_{k_s}$, receiving a matrix U from the client device, and computing an inference value y from the matrix U.

20 Claims, 6 Drawing Sheets

(51) Int. Cl.
    *G06N 20/00*     (2019.01)
    *G06F 21/60*     (2013.01)

(56) References Cited

U.S. PATENT DOCUMENTS

| | | | |
|---|---|---|---|
| 2020/0242466 A1* | 7/2020 | Mohassel | G06F 21/62 |
| 2020/0252198 A1* | 8/2020 | Nandakumar | G06N 3/063 |

FOREIGN PATENT DOCUMENTS

| | | |
|---|---|---|
| CN | 111669366 A | 9/2020 |
| WO | 2019183629 A1 | 9/2019 |

OTHER PUBLICATIONS

Privacy-Preserving Inference in Crowdsourcing Systems, 2017 IEEE Conference on Communications and Network Security (CNS) (Year: 2017).*

International Search Report and Written Opinion issued in co-pending International application No. PCT/CN2021/092211 dated Jul. 27, 2021.

* cited by examiner

SYSTEM, METHOD AND APPARATUS FOR PRIVACY PRESERVING INFERENCE

CROSS-REFERENCE TO RELATED APPLICATIONS

This is the first application filed for the instantly disclosed technology.

FIELD OF THE INVENTION

The present invention generally relates to machine learning/neural network system and, in particular, to a system, method, and apparatus for Privacy Preserving Inference (PPI).

BACKGROUND

Inference is a procedure wherein a trained machine learning/neural network model is used to predict outputs for a given input. For example, a model trained to classify images of animals into different species can be used to identify the species of an animal from its image (the procedure of inference). To perform the inference, generally information is sent from a client device to a server, thereby compromising with the client's privacy.

The users operating the client device using the trained machine learning/neural network model for inference may not want to reveal their input, as the inputs may contain sensitive information. At the same time, it may not be desirable to disclose the operating parameters associated with the trained machine learning/neural network model such as weights to the client device. To this end, the inputs from the client device containing the private information should be kept private on the client side and the weights associated with the trained machine learning/neural network model should be kept private on the server side. In this scenario, the server can have access to the inferences, without violating any privacy. But the client device cannot have access to the inferences as it may reveal the weights.

With this said, there is an interest in computing the output of the trained machine learning/neural network model at the server, while keeping the original input private at the client device and the operational parameters (e.g. weights) be known only to the server.

These challenges may be exacerbated by certain proposed systems. Such proposed systems include homomorphic encryption. Such encryption is computationally expensive as a public-key encryption operation has to be applied to each element of the input vector. Also, homomorphic encryption based systems have to deal with the key management issues thereby straining the hardware components and software processing resources associated with the system.

SUMMARY

Embodiments of the present disclosure have been developed based on developers' appreciation of shortcomings associated with the prior art.

The present disclosure provides a Privacy Preserving Inference (PPI) environment configured to preserve sensitive information associated with the user, organizations, institutions, or the like may be preserved at the client side at the same time operating parameters associated with the trained machine learning/neural network model may be preserved on the server side without relying on public-key encryption operation that may strain the associated hardware components and software processing resources.

In accordance with the first broad aspect of the present disclosure, there is provided method for Privacy Preserving Inference (PPI), implemented on a server, comprising: receiving a first set of matrix information from a client device, the first set of matrix information includes $k_c-1$ seeds and a matrix $X_{k_c}$, where $k_c$ is an integer value; generating $k_c-1$ matrices by operating a first cryptographically secure pseudorandom generators (CSPRNG) associated with the server with $k_c-1$ seeds and representing the $k_c-1$ matrices and the matrix $X_{k_c}$ as a set of $k_c$ matrices, where the matrix $X_{k_c}$ is the $k_c$th matrix in the set of $k_c$ matrices; computing inferences from each of the matrix in the set of $k_c$ matrices and representing the inferences as an inference matrix Y having a first dimension; generating a matrix $S_s$, the matrix $S_s$ includes $k_s$ random coefficients, where $k_s$ is an integer value; generating $k_s-1$ random matrices, each random matrix having same dimensions as that of the inference matrix Y; computing a matrix $Y_{k_s}$ in accordance with the inference matrix Y, the matrix $S_s$ and the $k_s-1$ random matrices and representing $k_s-1$ random matrices and the matrix $Y_{k_s}$ as a set of $k_s$ matrices; transmitting a second set of matrix information to the client device, the second set of matrix information includes $k_s-1$ seeds corresponding to the $k_s-1$ random matrices and the matrix $Y_{k_s}$; receiving a matrix U from the client device; and computing an inference value y from the matrix U.

In accordance with other aspects of the present disclosure, the method, wherein the matrix $X_{k_c}$ is computed by the client device as:

$$X_{k_c} = \frac{X - \sum_{i=1}^{k_c-1} X_i \cdot s_{ci}}{s_{ck_c}}$$

Where:
X is an input matrix corresponding to a sensitive information selected by the client device,
$X_i$ is the ith matrix in a set of $k_c$ matrices generated by the client device, $k_c-1$ matrices in the set of $k_c$ matrices are randomly generated,
$s_{ci}$ is the ith coefficient in a matrix $S_c$, the matrix $S_c$ including $k_c$ random coefficients is generated by the client device, and
$s_{ck_c}$ is the $k_c$th coefficient in the matrix $S_c$.

In accordance with other aspects of the present disclosure, the method, wherein the $k_c-1$ random matrices are generated by operating a second CSPRNG associated with the client device with $k_c-1$ seeds.

In accordance with other aspects of the present disclosure, the method, wherein the value of $s_{ck_c}$ is equal to 1.

In accordance with other aspects of the present disclosure, the method, wherein the matrix $Y_{k_s}$ is computed as:

$$Y_{k_s} = \frac{Y - \sum_{i=1}^{k_s-1} Y_i \cdot s_{si}}{s_{sk_s}}$$

Where:
$Y_i$ is the ith matrix in a set of $k_s$ matrices,
$s_{si}$ is the ith coefficient in the matrix $S_s$, and
$s_{sk_s}$ is the $k_s$th coefficient in the matrix $S_s$ In accordance with other aspects of the present disclosure, the method, wherein the value of $s_{ck_s}$ is equal to 1.

In accordance with other aspects of the present disclosure, the method, wherein elements of the matrix U are computed as:

$$u_i = Y_i^T \cdot S_c$$

Where:
$u_i$ is the ith element of the matrix U, and
$Y_i^T$ is a transpose of ith matrix in the set of $k_s$ matrices.

In accordance with other aspects of the present disclosure, the method, wherein the $k_s$th matrix $Y_{k_s}$ is computed as:

$$Y_{k_s} = \frac{Y - \sum_{i=1}^{k_s-1} Y_i \cdot s_{si}}{s_{sk_s}}$$

Where:
$Y_i$ is the ith matrix in the set of $k_s$ matrices,
$s_{si}$ is the ith coefficient in the matrix $S_s$, and
$s_{sk_s}$ is the $k_s$th coefficient in the matrix $S_s$.

In accordance with other aspects of the present disclosure, the method, wherein the value of $s_{sk_s}$ is equal to 1.

In accordance with other aspects of the present disclosure, the method, wherein elements of the matrix U are computed as:

$$u_i = Y_i^T \cdot S_c$$

Where:
$u_i$ is the ith element of the matrix U, and
$Y_i^T$ is a transpose of ith matrix in the set of $k_s$ matrices.

In accordance with other aspects of the present disclosure, the method, wherein the inference value y is computed as:

$$y = \sum_{i=1}^{i=k_s} u_i \cdot s_{si}$$

Where:
$u_i$ is the ith element of the matrix U, and
$s_{si}$ is the ith coefficient in the matrix $S_s$.

In accordance with other aspects of the present disclosure, the method, wherein the $k_s-1$ random matrices are generated by operating the first CSPRNG associated with the server with $k_s-1$ seeds.

In accordance with other aspects of the present disclosure, the method, wherein the server is further configured to derive a feature from the inference value y.

In accordance with other aspects of the present disclosure, the method, wherein the server transmits the derived feature to the client device.

In accordance with the second broad aspect of the present disclosure, there is provided a system for Privacy Preserving Inference (PPI) comprising: a server comprising: a processor for executing instructions; a non-transitory memory element for storing instructions, which when executed by the processor configure the system to perform steps for: receiving a first set of matrix information from a client device, the first set of matrix information includes $k_c-1$ seeds and a matrix $X_{k_c}$, where $k_c$ is an integer value; generating $k_c-1$ matrices by operating a first cryptographically secure pseudorandom generators (CSPRNG) associated with the server with $k_c-1$ seeds and representing the $k_c-1$ matrices and the matrix $X_{k_c}$ as a set of $k_c$ matrices, where the matrix $X_{k_c}$ is the $k_c$th matrix in the set of $k_c$ matrices; computing inferences from each of the matrix in the set of $k_c$ matrices and representing the inferences as an inference matrix Y having a first dimension; generating a matrix $S_s$, the matrix $S_s$ includes $k_s$ random coefficients, where $k_s$ is an integer value; generating $k_s-1$ random matrices, each random matrix having same dimensions as that of the inference matrix Y; computing a matrix $Y_{k_s}$ in accordance with the inference matrix Y, the matrix $S_s$ and the $k_s-1$ random matrices and representing $k_s-1$ random matrices and the matrix $Y_{k_s}$ as a set of $k_s$ matrices; transmitting a second set of matrix information to the client device, the second set of matrix information includes $k_s-1$ seeds corresponding to the $k_s-1$ random matrices and the matrix $Y_{k_s}$; receiving a matrix U from the client device; and computing an inference value y from the matrix U.

In accordance with other aspects of the present disclosure, the system, wherein the matrix $X_{k_c}$ is computed by the client device as:

$$X_{k_c} = \frac{X - \sum_{i=1}^{k_c-1} X_i \cdot s_{ci}}{s_{ck_c}}$$

Where:
X is an input matrix corresponding to a sensitive information selected by the client device,
$X_i$ is the ith matrix in a set of $k_c$ matrices generated by the client device, $k_c-1$ matrices in the set of $k_c$ matrices are randomly generated,
$s_{ci}$ is the ith coefficient in a matrix $S_c$, the matrix $S_c$ including $k_c$ random coefficients is generated by the client device, and
$s_{ck_c}$ is the $k_c$th coefficient in the matrix $S_c$.

In accordance with other aspects of the present disclosure, the system, wherein the $k_c-1$ random matrices are generated by operating a second CSPRNG associated with the client device with $k_c-1$ seeds.

In accordance with other aspects of the present disclosure, the system, wherein the value of $s_{ck_c}$ is equal to 1.

In accordance with other aspects of the present disclosure, the system, wherein the matrix $Y_{k_s}$ is computed as:

$$Y_{k_s} = \frac{Y - \sum_{i=1}^{k_s-1} Y_i \cdot s_{si}}{s_{sk_s}}$$

Where:
$Y_i$ is the ith matrix in a set of $k_s$ matrices,
$s_{si}$ is the ith coefficient in the matrix $S_s$, and
$s_{sk_s}$ is the $k_s$th coefficient in the matrix $S_s$.

In accordance with other aspects of the present disclosure, the system, wherein elements of the matrix U are computed as:

$$u_i = Y_i^T \cdot S_c$$

Where:
$u_i$ is the ith element of the matrix U, and
$Y_i^T$ is a transpose of ith matrix in the set of $k_s$ matrices.

In accordance with other aspects of the present disclosure, the system, wherein the inference value y is computed as:

$$y = \sum_{i=1}^{i=k_s} u_i \cdot s_{s_i}$$

Where:

$u_i$ is the ith element of the matrix U, and $s_{s_i}$ is the ith coefficient in the matrix $S_s$.

In accordance with other aspects of the present disclosure, the system, wherein the $k_s-1$ random matrices are generated by operating the first CSPRNG associated with the server with $k_s-1$ seeds.

BRIEF DESCRIPTION OF THE FIGURES

Further features and advantages of the present disclosure will become apparent from the following detailed description, taken in combination with the appended drawings, in which.

Figure 1:
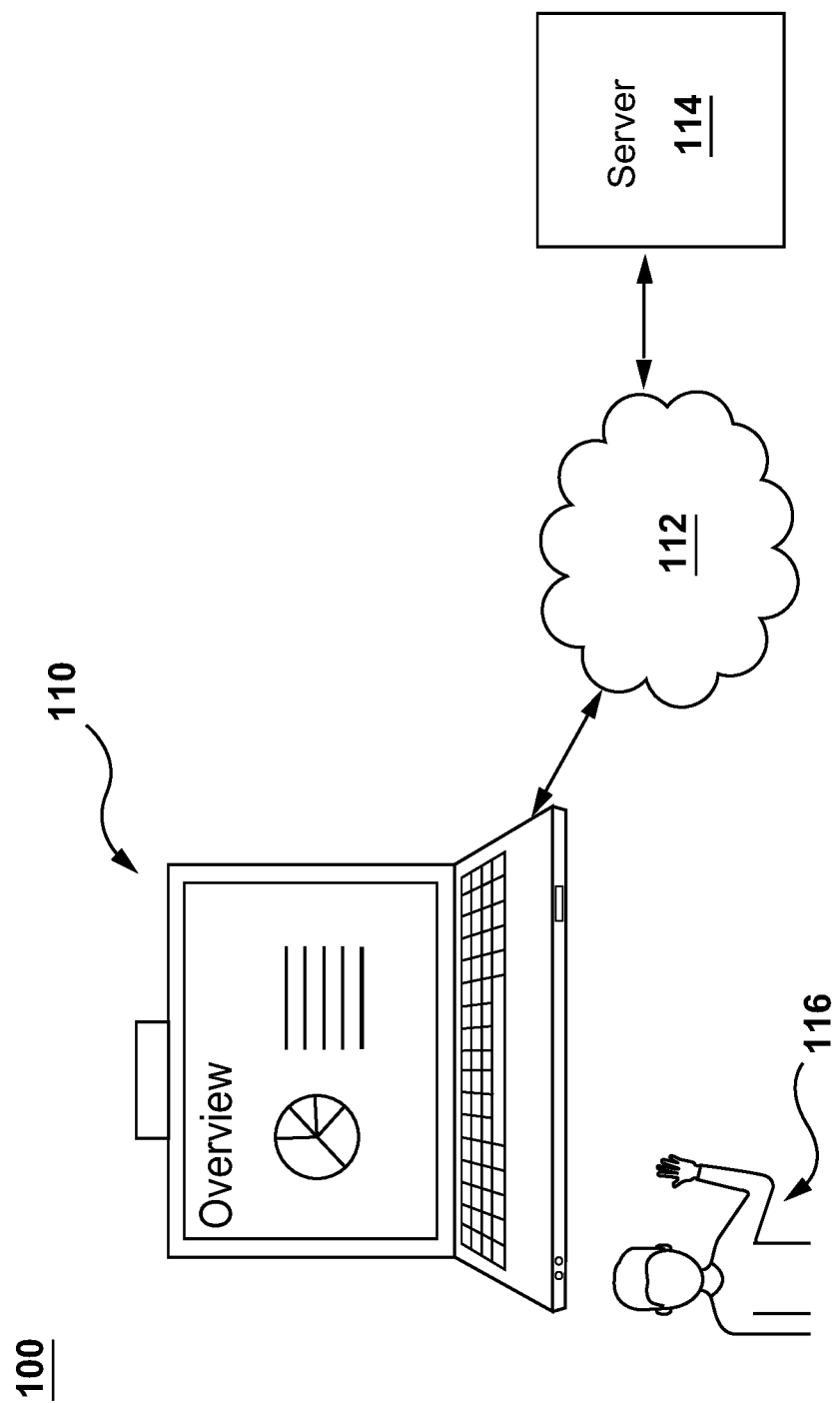
FIG. 1 depicts a Privacy Preserving Inference (PPI) environment configured to preserve the privacy of a user and operating parameters associated with the trained machine learning/neural network model, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and method for Privacy Preserving Inference (PPI).

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, the expression "information" includes information of any nature or kind whatsoever capable of being stored in a database. Thus information includes, but is not limited to audiovisual works (images, movies, sound records, presentations, etc.), data (location data, numerical data, etc.), text (opinions, comments, questions, messages, etc.), documents, spreadsheets, user activity logs, etc.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and method for Privacy Preserving Inference (PPI).

In certain representative embodiments, organizations or institutions dealing with sensitive information, such as, for example, financial institutions, health organizations, governmental organizations, or the like, may be designated to process the sensitive information they possess, to extract additional value or information, to enhance the information, or the like. The sensitive information may represent any information that is meant to be kept secret. Some examples of sensitive information may include but are not limited to a shopping history, allocation of financial assets, outstanding loans, balance in the checking account, health care information, social security information or the like. In order to process and extract more value from the sensitive information an organization possesses, the organization may employ services provided by an external service provider to perform the analytics and the additional information extraction.

The external service providers may be equipped with advanced analysis techniques, substantial resources, access to other available sources of information, or the like. The external service providers may use technologies and resources that the organization may not have access to, services that the organization may not provide, or the like. It is to be noted that the external service providers may be able to enhance the information of the organization in a relatively short time by performing various computations using the disclosed technology, in an efficient manner, in a manner providing added information of relatively high value, or the like. However, sharing the sensitive information of the organizations with external service providers may be associated with the risk of information leakage. The organizations may be required to maintain the confidentiality of the sensitive information, and avoid revealing the information, even to service providers that are supposed to process the information itself.

On the other hand, in certain scenarios, the external service providers may rely on machine learning algorithms (MLAs) to process the information of the organization. The processed outcome of the MLAs returned to the organizations may reveal operational parameters associated with the MLAs (e.g. weights, bias, or the like).

To this end, in certain embodiments, the organization using the services of the external service provider may randomize sensitive information before providing it to the external service provider. As a result, the original sensitive information may be retained internally within the organization, within its information repositories. Additionally or alternatively, the external service provider may supply a derived feature that is based on the sensitive information. The derived feature may summarize the sensitive information may provide an abstraction thereof, or the like. For example, the derived feature may be a credit score of the person associated with the information based on the sensitive information.

In certain representative embodiments, the external service provider may operate, at least in part, off the premises of the organization. The external service provider may utilize an off-premise system for enhancing the information, such as a Software-as-a-Service (SaaS) system, a cloud computing system, or the like. The off-premise system may be installed and executed at a remote facility such as a server farm, in the cloud, or the like, reachable via a computerized network such as the Internet. The off-premise system may not have access to information retained on-premises of the organization.

In certain representative embodiments, the organization may retain its sensitive information in an on-premise system thereof. The on-premise system may be installed and executed on client devices within the logical premises of the organization. The on-premise system may comprise an in-house server, computing infrastructure, or the like. The on-premise system may be controlled by the organization. The on-premise system may be administrated by a member of the organization. The on-premise system may utilize the organization's computing resources to provide computational functions for the organization. The on-premise system may be configured to execute entities associated with the organization, such as programs provided with permission to be executed in the on-premise system. In some cases, entities associated with external entities, such as service providers, may also be executed by the on-premise system. The organization may be responsible for the security, availability and overall management of on-premises system.

It will be noted that terms "on-premise" and "off-premise" used in the present disclosure are used to provide a logical distinction and not a physical one. A system may be referred to as "on-premise" even if some or all of the computers comprised of it are located in remote locations, as long as they are controlled by the organization. In some cases, the on-premise systems may be included within a local network of the organization, such as an intranet, and may not involve external networks, such as the Internet, other LAN networks, or the like. The organization may be in control of devices in the on-premise system and may consider information retained therein as retained by the organization itself and not retained by a third party.

In certain embodiments, the information may be retained as records. In certain embodiments, each record may be associated with a person, such as a customer of the organization, a citizen, a subject, or the like. In some examples, the sensitive information may comprise ID number, a passport number, a social security number, driving license number, or the like; date or place of birth; biometric records, such as the face, fingerprints, or handwriting, or the like; vehicle registration plate number; credit card numbers; genetic information; login name; alias; telephone number; or the like. In some examples, the sensitive information may comprise information that is linked or linkable to the individual, such as medical, educational, financial, employment information, or the like. Additional examples of sensitive information may be grades, salary, job position, criminal record, Web cookies, purchase history, past locations, financial status, employment history, or the like.

With this said, FIG. 1 depicts a Privacy Preserving Inference (PPI) environment 100 configured to preserve the privacy of a user and operating parameters associated with the trained machine learning/neural network model, in accordance with various embodiments of the present disclosure. PPI environment 100 may include multiple client devices 110 (for the purpose of simplicity only one client device 110 has been illustrated) located and different geographic locations that are configured to communicate with each other via a communication network 112 and a PPI server 114. Multiple client devices 110 may be associated with (e.g., used by) users (i.e., user 116) of PPI environment 100. Although FIG. 1 shows one client device 110 associated with one user 116, it will be appreciated that in alternative embodiments, PPI environment 100 may include any number of client devices 110 associated with any number of users 116. Also, in other alternative embodiments, client device 110 may be associated with multiple users 116.

Further, in certain embodiments, multiple client devices 110 may be associated with an on-premise system. In certain embodiments, one or more electronic devices 110 may act as in house servers for the on-premise system while other electronic devices 110 may be associated with one or more user 116 of PPI environment 100. Also, in certain embodiments, PPI server 114 may be associated with the off-premise system.

Figure 2A:
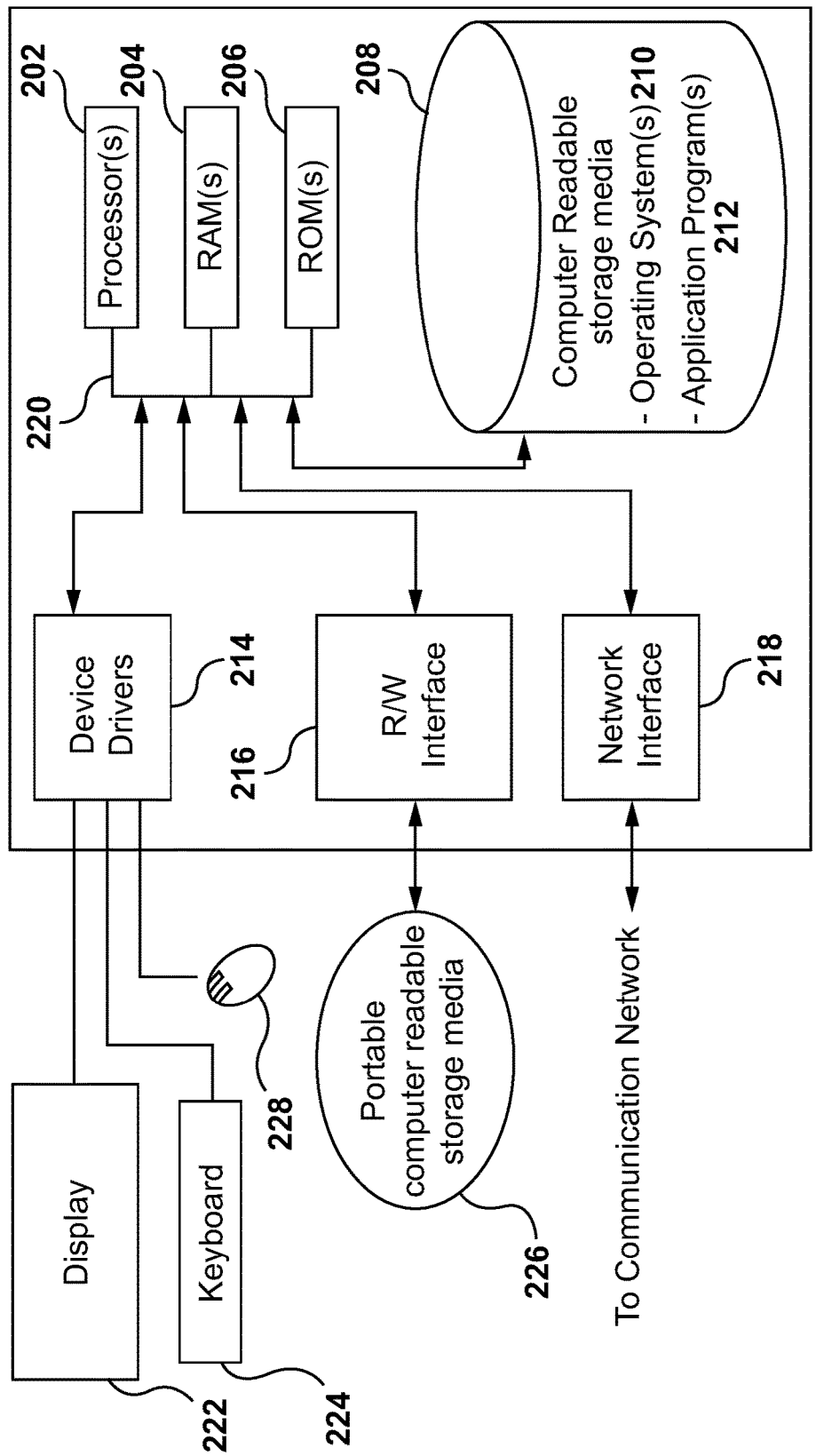
FIG. 2A depicts a high level functional block diagram of a client device of the PPI environment of FIG. 1, in accordance with various embodiments of the present disclosure.

FIG. 2A depicts a high-level block diagram of components of client device 110, in accordance with various embodiments of the present disclosure. It should be appreciated that FIG. 2A provides only an illustration of one implementation of client device 110 and does not imply any limitations with regard to the environments in which different embodiments may be implemented. Many modifications to the depicted environment can be done to implement client device 110 without departing from the principles presented herein. Client device 110 may be a server, a desktop computer, a laptop computer, a tablet, a smart-phone, a personal digital assistant or any device that may be configured to implement the present technology, as should be understood by a person skilled in the art.

As shown, client device 110 employs one or more processors 202, one or more computer-readable random access memories (RAMs) 204, one or more computer-readable read only memories (ROMs) 206, one or more computer-readable storage media 208, device drivers 214, a read/write (R/W) driver interface 216, a network interface 218, all interconnected over a communication fabric 220. Communication fabric 220 may be implemented with any architecture designed for passing data and/or control information between processors (such as microprocessors, communications and network processors, etc.), system memory, peripheral devices, and any other hardware components within a system.

One or more operating systems 210 and one or more application programs 212 are stored on one or more of computer-readable storage media 208 for execution by one or more of the processors 202 via the one or more of respective RAMs 204 (which typically include a cache memory). In the illustrated embodiment, each of computer-readable storage media 208 maybe a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

R/W driver interface 216 reads from and writes to one or more portable computer-readable storage media 226. Application programs 212 may be stored on one or more of portable computer-readable storage media 226, read via respective R/W driver interface 216 and loaded into respective computer-readable storage media 208.

Further, network interface 218 may be based on a TCP/IP adapter card or wireless communication adapter (such as a 4G wireless communication adapter using OFDMA technology). Application programs 212 on client device 110 may be downloaded to client device 110 from an external computer or external storage device via a communication network (for example, the Internet, a local area network or other wide area network or wireless network) and network interface 218. From network interface 218, application programs 212 may be loaded onto computer-readable storage media 208. Client device 110 may connect to routers, firewalls, switches, gateway computers and/or edge servers of the communication network using copper wires, optical fibers, wireless transmission, and the like.

Client device 110 may also include a display screen 222, a keyboard or keypad 224, and a computer mouse or touchpad 228. Device drivers 214 may interface with display screen 222 for imaging, with keyboard or keypad 224, with computer mouse or touchpad 228, and/or with display screen 222 (which may be a touch sensitive display) for alphanumeric character entry and user selections. Device drivers 214, R/W driver interface 216 and network interface 218 may comprise hardware and software (stored on computer-readable storage media 208 and/or ROM 206).

Figure 2B:
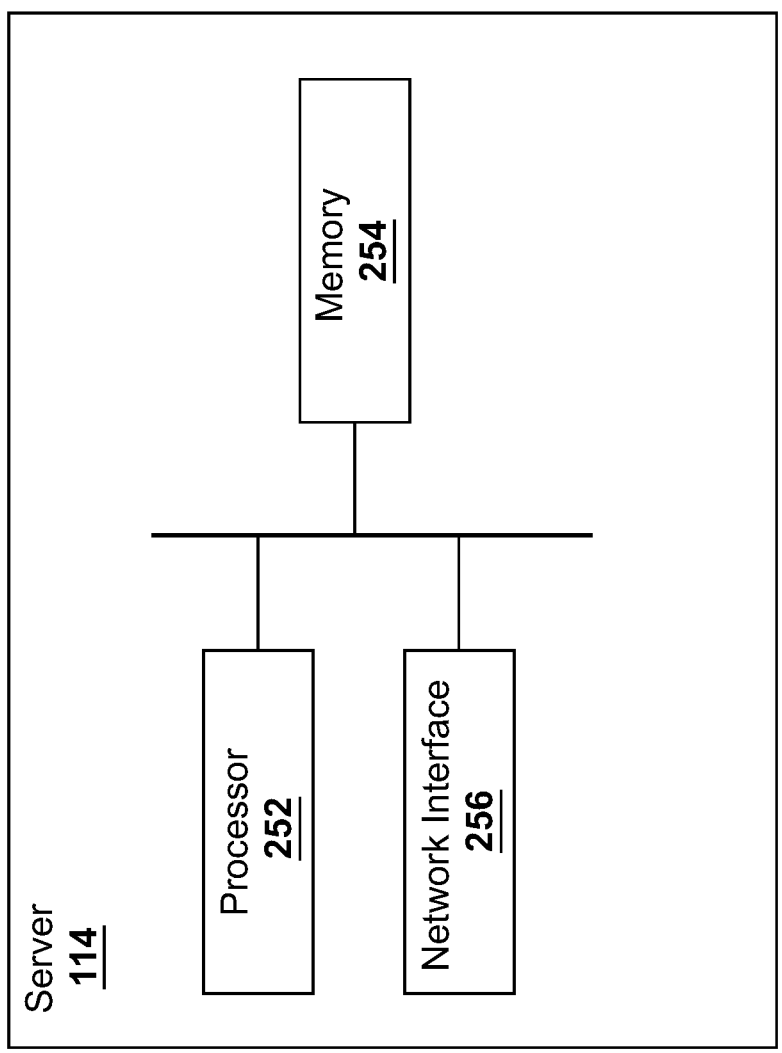
FIG. 2B depicts a high level functional block diagram of PPI server of the PPI environment of FIG. 1, in accordance with various embodiments of the present disclosure.

FIG. 2B depicts a high level functional block diagram of PPI server 114 of the PPI environment 100 of FIG. 1, in accordance with various embodiments of the present disclosure. In this embodiment, PPI server 114 is a physical machine (e.g. a physical server) or virtual machine (e.g. a virtual server) that executes PPI software to enable client devices 110 to communicate with PPI server 114. PPI server 114 includes a processor 252, a memory 254, and a network interface 256.

Processor 252 of PPI server 114 may include one or more of a CPU, an accelerator, a microprocessor, a GPU, an ASIC, a FPGA, a dedicated logic circuitry, a dedicated artificial intelligence processor unit, or combinations thereof.

Memory 254 may include volatile memory (e.g. RAM) and non-volatile or non-transitory memory (e.g., a flash memory, magnetic storage, and/or a ROM). The non-transitory memory(ies) stores a platform that controls the overall operation of PPI server 114. The platform, when executed by processor 252, implements PPI applications. The platform stores in the memory a unique identifier for each user of the PPI applications and manages the unique identifier or each user of the PPI applications. The unique identifier for a user may be a username or an email address of the user. A password may also be associated with the unique identifier for a user and stored in memory 254.

Network interface 256 may include one or more radios configured for wireless communications with communication network 112, or one or more network adaptors configured for wired communications with communication network 112. In general, network interface 256 is configured to correspond with the network architecture of that is used to implement a link for communications between PPI server 114 and communication network 112.

It is to be noted that PPI server 114 is shown as a standalone computer. However, the implementation of various other embodiments of the present disclosure may include any client-server model where client devices may run a client version of the PPI software. Other examples of PPI server 114 may include a distributed computing system that runs the server version of the PPI software, a virtual machine (or virtual machines) instantiated by the infrastructure of a public or private cloud, or a cloud service provider that provides the PPI software as a service (SaaS). Such implementations or any other similar implementation should not limit the scope of the present disclosure.

In other non-limiting embodiments, client device 110 may use a web browser, such as, for example, Chrome™, Safari™, Mozilla™, or the like to facilitate PPI applications. It is to be noted that how client devices 110 are configured to facilitate PPI application should not limit the scope of the present disclosure by any means.

Returning to FIG. 1, in certain embodiments, user 116 may be willing to use certain services provided by PPI sever 114. By way of example, user 116 may want to check his/her credit ratings with a bank. The bank may rely on a server including a trained machine learning/neural network model to predict the credit ratings based on spending habits of user 116. However, user 116 may not be willing to share his/her spending information with the bank, as it may reveal personal and/or sensitive information associated with user 116. At the same time, the bank may also not be willing to provide the operational parameters associated with the trained machine learning/neural network model to the user 116 for inference. In another embodiment, user 116 may be willing to categorize the images, based on facial recognition, stored in client device 110. To this end, user 116 may have to send the images to a server including a trained machine learning/neural network model to categorize the images. However, user 116 may not be willing to share his/her personal images.

Thus, there is an interest in computing the output of the trained machine learning/neural network model at PPI server 114, while keeping the original input private at client device 110 and the operational parameters (e.g. weights, bias, or the like) be known only to PPI server 114.

In certain embodiments, PPI environment 100 may rely on random matrix sampling (RMS) based non-cryptographic algorithm to preserve sensitive information on client device 110 at the same time preserve the operational parameters (e.g. weights, bias, or the like) at PPI server 114. In certain embodiments, RMS may be an algorithm of generating $k_c-1$ random matrices from the input matrix X, and $k_c$ random coefficients, and constructing a set of matrices that may be recovered by PPI server 114, but is unidentifiable to the unauthorized service providers without having the value of the $k_c$ random coefficients. In so doing, no cryptographic algorithm is required to maintain the privacy.

Figure 3:
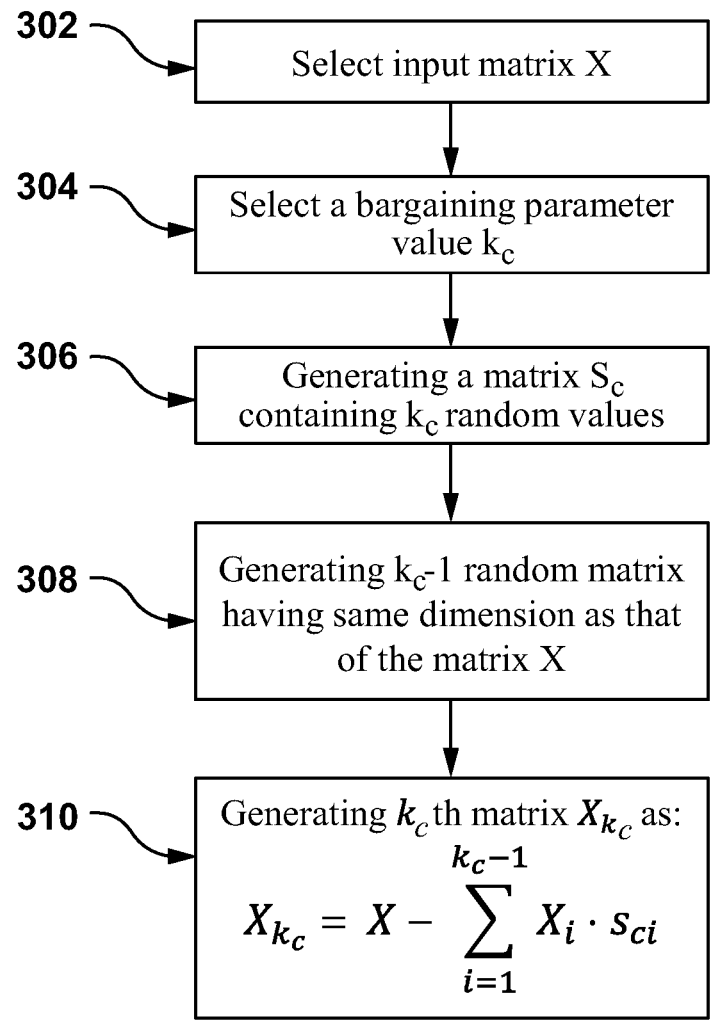
FIG. 3 illustrates a flowchart representing a process implemented on the client device, in accordance with various embodiments of present disclosure.

With this said, FIG. 3 illustrates a flowchart representing a process 300 implemented on client device 110, in accordance with various embodiments of present disclosure. As shown, process 300 begins at step 302 where client device 110 may select an input matrix X. In certain embodiments, client device 110 may be configured to select the input matrix X such that the input matrix X may be associated with sensitive information. In one embodiment, the sensitive information may be stored in the memory associated with client device 110. In another embodiment, the sensitive information may be stored on a cloud and client device 110 may access the cloud to extract the input matrix X. In certain embodiments, the matrix X may be a (N×1) dimensional input matrix. In another embodiment, the matrix X may be a (M×N) dimensional input matrix.

Process 300 advances to step 304, where client device 110 selects a bargaining parameter $k_c$. In certain embodiments, the bargaining parameter $k_c$ may be an integer value. It is to be noted that a higher value of the bargaining parameter $k_c$ will make it more difficult for unauthorized external service providers to infer the original matrix X. Also, it will make more difficult for authorized external service providers to calculate the intended values associated with the original matrix X. To this end, the value of the bargaining parameter $k_c$ may be selected as a trade-off value between the degree of privacy and efficiency. The value of the bargaining parameter $k_c$ may be selected neither too high nor too low.

In certain embodiments, the value of the bargaining parameter $k_c$ may be of the order of few hundreds such as, for example, 200, 300, 400, or the like. In certain embodiments, the value of the bargaining parameter $k_c$ may be set in agreement with PPI server 114 such that client device 110 may use an agreed value of the bargaining parameter $k_c$. For example, if the agreed value of the bargaining parameter $k_c$ is 200, then at step 304 client device 110 may use this agreed value of 200.

Process 300 advances to step 306, where client device 110 generates a matrix $S_c$ containing $k_c$ random values. In certain embodiments, the $k_c$ random values may be real numbers. In certain embodiments, the last coefficient $s_{ck_c}$ of the matrix $S_c$ may not be a random value and may have a value equals to 1. The matrix $S_c$ may be represented as equation (1):

$$S_c = [s_{c1}, s_{c2}, s_{c3} \ldots s_{ck_c}] \tag{1}$$

Process 300 advances to step 308, where client device 110 generate $k_c-1$ random matrices of the same dimensions as that of the input matrix X. If the input matric X is one dimensional matrix of dimensions N×1 then the $k_c-1$ random matrices are of N×1 dimensions. If the input matrix X is two-dimensional matrix of dimensions M×N then the $k_c-1$ random matrices are of M×N dimensions.

Finally, process 300 proceeds to step 310, where client device 110 generates $k_c$th matrix by multiplying each of the random matrix $X_i$ generated at step 308 by its corresponding random coefficient $s_{ci}$ and adding them all together, and then subtract them from the original matrix X. The resulting matrix $X_{k_c}$ may be used for inference, without revealing the value of the original matrix X, as long as the random coefficients matrix $S_c$ is not revealed. The resulting matrix $X_{k_c}$ may be expressed as equation (2):

$$X_{k_c} = \frac{X - \sum_{i=1}^{k_c-1} X_i \cdot s_{ci}}{s_{ck_c}} \tag{2}$$

The equation (2) may be rewritten in terms of input matrix X as equation (3):

$$X = \Sigma_{i=1}^{k_c} X_i \cdot s_{ci} \tag{3}$$

In certain embodiments, the value of $s_{ck_c}$ may be equals to 1.

Once a set of $k_c$ matrices $[X_1, X_2, X_3 \ldots X_{k_c-1}, X_{k_c}]$ is generated, in certain embodiments, the set of $k_c$ matrices may be transmitted to PPI server 114 for inference. It is contemplated that the set of $k_c$ matrices may include $k_c-1$ randomly generated matrices and the resulting matrix $X_{k_c}$ as represented by the equation (2).

It is to be noted that, in certain embodiments, each entry in the random $X_i$ matrix, where $1 \leq i \leq k_{c-1}$, may be B bits long. If the random matric $X_i$ is one dimensional matrix of dimensions N×1 then the total number of random bits associated with the random matrix $X_i$ is N×B. Also, if the random matric $X_i$ is two-dimensional matrix of dimensions M×N then the total number of random bits associated with the random matrix $X_i$ is M×N×B. It is contemplated that the matrix $X_{k_c}$ is not a random matrix, rather it may be generated using a set of $k_c-1$ random matrices. However, in certain embodiments each element of the matrix $X_{k_c}$ may still be b bits long and may have a total N×B bits or M×N×B bits, depending on if the matrix $X_{k_c}$ is a one-dimensional matrix or a two-dimensional matrix.

With this being said, in certain embodiments, to transmit the set of $k_c$ matrices to PPI server 114 may add a burden on the operational network resources in terms of the required bandwidth. For example, if in each matrix in the set of $k_c$ matrices has around $10^6$ elements with each element being 32 bit, then to transmit the set of $k_c$ matrices, it requires $32 \times 10^6 \times k_c$ bits. To counter such situations where bandwidth is a concern, in certain embodiments, client device 110 may rely on pseudorandom generators, such as cryptographically secure pseudorandom generators (CSPRNG) to generate $k_c-1$ random matrices of the same dimensions as that of the input matrix X.

In certain embodiments, CSPRNG takes input as a fixed bit length value seed, which is sufficiently random, and generates a variable length sequence (length depends on how many random bits are required to be extracted from the CSPRNG) that appears to be random in such a manner that the variable length sequence may not be distinguished from a truly random sequence. The CSPRNG, when fed with the same seed, will generate the same random sequence. In certain embodiments, the seed may be generated based on some source of randomness, in client device 110, for example, it may be generated based on mouse movements, key strokes, etc.

A person skilled in the art would readily understand that using a block cipher in a counter mode may act as a CSPRNG. In certain embodiments, the block cipher may be used in the counter mode. To this end, client device 110 may select a random key and may encrypt the increasing values of the counter (in certain embodiments, the counter may start from 0) associated with the block cipher using the random key. In so doing the block cipher may generate a stream of bites that are hard to distinguish from true random bits. The random key may act as a seed.

By way of example, a block cipher such as AES-128 that takes a 128-bit input, a random key of length 128 bits, an initialization "vector" of length 128 bits and outputs a cipher block of length 128 bits. In order to use the block cipher in the counter mode to generate a pseudo-random sequence, select a random key of length 128 bits, and encrypt 0 to get the first pseudo-random block of 128 bits, then encrypt 1 to get the next block of 128 pseudo-random bits, and so on. It is to be noted that, if two instances of a CSPRNG are initiated with the same values, including the same random keys seeds, the same sequence of bits may be generated.

With this said, in certain embodiments using the CSPRNG, client device 110 may generate $k_c-1$ random matrices using $k_c-1$ seeds. In certain embodiments, instead of sending a set of $k_c$ matrices, client device 110 may transmit a first set of matrix information including $k_c-1$ seeds along with $k_c$th matrix to PPI server 114. It is to be noted that, in certain embodiments, the size of a seed may be fixed and is smaller than the size of the random matrix $X_i$, i.e. the total number of bits in a seed are less as compared to the total number of bits in the random matrix $X_i$. For example, if the random matrix $X_i$ has around $10^6$ elements with each element being 32 bit, then the random matrix $X_i$ has around random $32 \times 10^6$ bits. Also, let the seed length is 128 bits. Then instead of transmitting $32 \times 10^6$ bits per random matrix, in certain embodiments, client device 110 may transmit 128 bits per random matrix. In so doing, the burden on the operational network resources in terms of the required bandwidth may be reduced by a factor of $25 \times 10^4$.

Hence, in certain embodiments, the number of bits transmitted for the set of $k_c$ matrices by client device 110 may be equals to $length_{seed} \times (k_c-1) + N \times B$ bits instead of $k_c \times N \times B$ bits for one dimensional input matrix X having dimensions of N×1. Similarly, for a two-dimensional input matrix X having dimensions of M×N, the number of bits transmitted for the set of $k_c$ matrices by client device 110 may be equals to $length_{seed} \times (k_c-1) + M \times N \times B$ bits instead of $k_c \times M \times N \times B$ bits.

Figure 4:
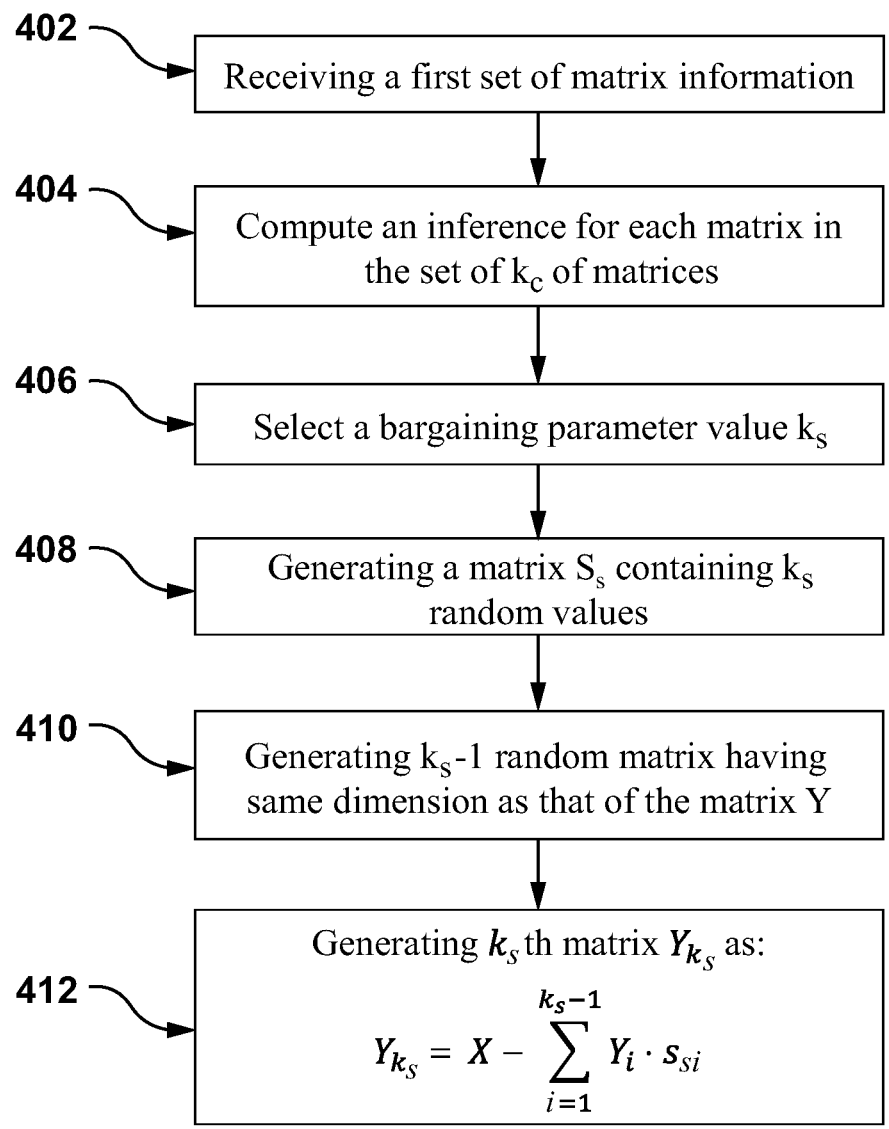
FIG. 4 illustrates a flowchart representing a process implemented on PPI server, in accordance with various embodiments of present disclosure.

FIG. 4 illustrates a flowchart representing a process 400 implemented on PPI server 114, in accordance with various embodiments of present disclosure. As shown, process 400 begins at step 402 where PPI server 114 receives the first set of matrix information from client device 110. Client device 110 may transmit the first set of matrix information using a wired or a wireless technique. In certain embodiments, the first set of matrix information may include the set of $k_c$ matrices as transmitted by client device 110. In certain embodiments, as discussed above, instead of transmitting the set of $k_c$ matrices client device 110 may transmit ($k_c$-1) seeds and $k_c$th matrix $X_{k_c}$. To this end, in certain embodiments, PPI server 114 may rely on a similar CSPRNG as used by client device 110 i.e. PPI server 114 may employ a CSPRNG. PPI server 114 may generate ($k_c$-1) matrices by operating the associated CSPRNG with ($k_c$-1) seeds. It is to be noted that the ($k_c$-1) matrices generated by PPI server 114 are same as ($k_c$-1) matrices generated by client device 110 using ($k_c$-1) seeds. The ($k_c$-1) matrices and the $k_c$th matrix $X_{k_c}$ may be represented as the set of $k_c$ matrices.

Figure 5:
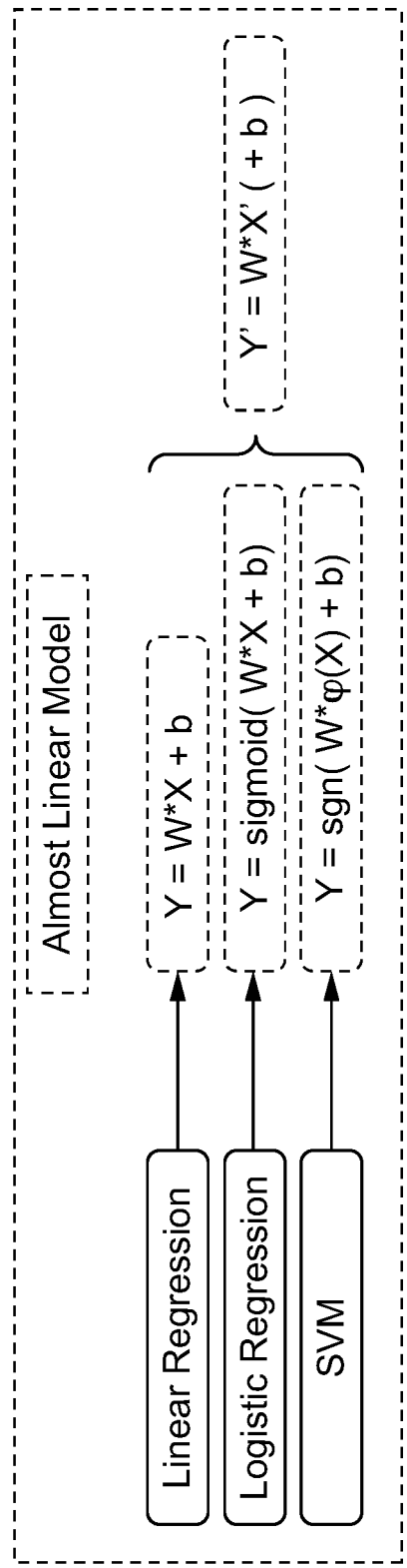
FIG. 5 illustrates various examples of the almost linear class of MLAs, in accordance with various embodiments of present disclosure.

Process 400 proceeds to step 404, where PPI server 114 computes an inference for each matrix in the set of $k_c$ matrices. In certain embodiments, PPI server 114 may rely on the almost linear class of MLAs. Typical MLAs falling into the category of the almost linear class may be represented as equation (5):

$$y = W^T \cdot X + b \qquad (5)$$

where X is the input matrix, W is a weight matrix, b is the bias, and y is the inference output. '·' represents dot product. FIG. 5 illustrates various examples of the almost linear class of MLAs, in accordance with various embodiments of present disclosure. Few examples of the almost linear class of MLAs include linear regression model, logistic regression model, support vector machine (SVM) model or the like. In certain embodiments, PPI server 114 may rely on any suitable almost or exactly linear class of MLAs.

Returning to FIG. 4, as discussed above, in order to maintain the privacy of the input matrix X, client device 110 may generate the set of $k_c$ matrices and transmit at least a means (e.g. ($k_c$-1) seeds along with the $k_c$th matrix) to PPI server 114 to access or generate the set of $k_c$ matrices. PPI server 114 may be configured to compute an inference for each matrix in the set of $k_c$ matrices. By way of example if the set of $k_c$ matrices include 200 matrices then PPI server 114 may compute 200 inferences and place all the inferences in an inference matrix Y. The inference matrix Y may be represented as equation (5):

$$Y = [y_1, y_2, y_3 \ldots y_{k_c}] \qquad (5)$$

Where, $y_1, y_2, y_3 \ldots y_{k_c}$ are $k_c$ inferences computed by the PPI server 114.

Once PPI server 114 has computed the inference matrix Y, in order to preserve the operational parameters (e.g. weights, bias, or the like) at PPI server 114, in certain embodiments, PPI server 114 may apply the RMS algorithm on the inference matrix Y in a similar manner as client device 110 applies the RMS algorithm on the input matrix X.

Process 400 advances to step 406, where PPI server 114 selects a bargaining parameter $k_s$. In certain embodiments, the bargaining parameter $k_s$ may be an integer value. It is to be noted that the value of the bargaining parameter $k_s$ associated with PPI server 114 may small as compared to the bargaining parameter $k_c$ associated with client device 110.

In certain embodiments, the value of the bargaining parameter $k_s$ may be of the order of few tens such as, for example, 10, 15, 20, or the like. In certain embodiments, the value of the bargaining parameter $k_s$ may be set in agreement with client device 110 such that PPI server 114 may use an agreed value of the bargaining parameter $k_s$. For example, if the agreed value of the bargaining parameter $k_s$ is 10, then at step 404 PPI server 114 may use this agreed value of 10.

Process 400 advances to step 408, where PPI server 114 generates a matrix $S_s$ containing $k_s$ random coefficients. In certain embodiments, the $k_s$ random coefficients may be real numbers and generated randomly. In certain embodiments, the last coefficient $s_{sk_s}$ of the matrix $S_s$ may not be a random coefficient and may have a value equals to 1. The matrix $S_s$ may be represented as equation (6):

$$S_s = [s_{s1}, s_{s2}, s_{s3} \ldots s_{sk_s}] \qquad (6)$$

Process 400 advances to step 410, where PPI server 114 generate $k_s$-1 random matrices of the same dimensions as that of the inference matrix Y. Each one of the $k_s$-1 random matrix may contain random coefficients. In certain embodiments, the random coefficients may be real numbers and generated randomly. Further, if the inference matrix Y is one dimensional matrix of dimensions N×1 then each one the $k_s$-1 random matrices are of N×1 dimensions. If the inference matrix Y is two-dimensional matrix of dimensions M×N then each one of the $k_s$-1 random matrices are of M×N dimensions.

Finally, process 400 proceeds to step 412, where PPI server 114 computes the $k_s$ th matrix $Y_{k_s}$ by multiplying each of the random matrix $Y_i$ from the $k_s$-1 random matrices generated at step 410 by the corresponding random coefficient $s_{si}$ and adding them all together, and then subtract them from the inference matrix Y. The resulting matrix $Y_{k_s}$ may be expressed as equation (7):

$$Y_{k_s} = \frac{Y - \sum_{i=1}^{k_s-1} Y_i \cdot s_{si}}{s_{sk_s}} \qquad (7)$$

The equation (5) may be rewritten in terms of inference matrix Y as equation (8):

$$Y = \sum_{i=1}^{k_s} Y_i \cdot s_{si} \qquad (8)$$

In certain embodiments, the value of $s_{sk_s}$ may be equals to 1.

Once a set of $k_s$ obstructed matrices [$Y_1, Y_2, X_3 \ldots Y_{k_s-1}, Y_{k_s}$] is generated, in certain embodiments, the set of $k_s$ obstructed matrices may be transmitted to client device 110 for further processing. It is contemplated that the set of $k_s$ obstructed matrices may include $k_s$-1 randomly generated matrices and the resulting matrix $Y_{k_s}$ as represented by the equation (7) that may obstruct client device 110 from finding inferences computed by PPI server 114, thereby preserving operational parameters associated with the MLAs (e.g. weights, bias, or the like) at PPI server 114 only.

It is to be noted that, in certain embodiments, instead of transmitting the set of $k_s$ obstructed matrices, PPI server 114 may rely on the associated CSPRNG to generate $k_s$-1 seeds and transmit $k_s$-1 seeds along with the resulting matrix $Y_{k_s}$ to client device 110, thereby reducing the burden on the operational network resources in terms of the required bandwidth.

Client device 110 may receive a second set of matrix information. In certain embodiments, the second set of matrix information may include the set of $k_s$ obstructed matrices as transmitted by PPI server 114. In certain embodiments, as discussed above, instead of transmitting the set of $k_s$ matrices PPI server 114 may transmit ($k_s$-1) seeds and $k_s$th matrix $Y_{k_s}$. To this end, in certain embodiments, client device 110 may rely on the associated CSPRNG to generate ($k_s-1$) matrices using ($k_s-1$) seeds. It is to be noted that the ($k_s-1$) matrices generated by client device 110 are same as ($k_s-1$) matrices generated by PPI server 114 using ($k_s-1$) seeds.

In certain embodiments, client device 110 may multiply transpose of each matrix in the set of $k_s$ obstructed matrices with the matrix $S_c$ such that $u_i=Y_i^T \cdot S_c$ where $Y_i^T$ is the transpose of the ith matrix in the set of $k_s$ obstructed matrices. In so doing, client device 110 may generate a matrix $U=[u_1, u_2, u_3 \ldots u_{k_s-1}, u_{k_s}]$ of size $k_s$.

In certain embodiments, client device 110 may transmit the matrix U to the PPI server 114. PPI server 114 may compute the final inference for the original input matrix X, by multiplying the matrix U with matrix $S_s$. The resulting matrix may be the inference value y and may be represented as equation (9):

$$y=\Sigma_{i=1}^{i=k_s} u_i \cdot s_{s_i} \qquad (9)$$

Additionally, in certain embodiments, PPI server 114 may derive certain features from the inference value y. Examples of such derived features may include but are not limited to approval for a loan, reduction in home insurance premium, reduction on auto insurance premium, reduction in medical insurance premium, approval of a credit card or the like linked to the sensitive information. In certain embodiments, PPI server 114 may provide such derived features to client device 110.

In this manner, PPI server 114 may be able to enhance the sensitive information in a relatively short time by performing various computations using the disclosed technology in an efficient manner Also, by virtue of PPI environment 100 sensitive information associated with the user, organizations, institutions, or the like may be preserved at the client side at the same time operating parameters associated with the trained machine learning/neural network model may be preserved on the server side.

It is to be understood that the operations and functionality of PPI environment 100, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for Privacy Preserving Inference (PPI), implemented on a server, comprising:
   receiving a first set of matrix information from a client device, the first set of matrix information including $k_c-1$ seeds and a matrix $X_{k_c}$, where $k_c$ is an integer value;
   generating $k_c-1$ matrices by operating a first cryptographically secure pseudorandom generators (CSPRNG) associated with the server with the $k_c-1$ seeds and representing the $k_c-1$ matrices and the matrix $X_{k_c}$ as a set of $k_c$ matrices, where the matrix $X_{k_c}$ is the $k_c$th matrix in the set of $k_c$ matrices;
   computing inferences from each of the matrix in the set of $k_c$ matrices and representing the inferences as an inference matrix Y having a first dimension;
   generating a matrix $S_s$, the matrix $S_s$ including $k_s$ random coefficients, where $k_s$ is an integer value;
   generating $k_s-1$ random matrices, each random matrix having same dimensions as that of the inference matrix Y;
   computing a matrix $Y_{k_s}$ in accordance with the inference matrix Y, the matrix $S_s$ and the $k_s-1$ random matrices and representing $k_s-1$ random matrices and the matrix $Y_{k_s}$ as a set of $k_s$ matrices;
   transmitting a second set of matrix information to the client device, the second set of matrix information including $k_s-1$ seeds corresponding to the $k_s-1$ random matrices and the matrix $Y_{k_s}$, a size of $k_s-1$ seeds being smaller than a size of the $k_s-1$ random matrices and utilizing a smaller transmission bandwidth as compared to bandwidth required to transmit the $k_s-1$ random matrices;
   receiving a matrix U from the client device; and
   computing an inference value y from the matrix U.

2. The method of claim 1, wherein the matrix $X_{k_c}$ is computed by the client device as:

$$X_{k_c} = \frac{X - \sum_{i=1}^{k_c-1} X_i \cdot s_{ci}}{s_{ck_c}}$$

where:
   X is an input matrix corresponding to a sensitive information selected by the client device,
   $X_i$ is the ith matrix in the set of $k_c$ matrices generated by the client device, the $k_c-1$ matrices in the set of $k_c$ matrices are randomly generated,
   $s_{ci}$ is the ith coefficient in a matrix $S_c$, the matrix $S_c$ including $k_c$ random coefficients is generated by the client device, and
   $s_{ck_c}$ is the $k_c$th coefficient in the matrix $S_c$.

3. The method of claim 2, wherein the $k_c-1$ random matrices are generated by operating a second CSPRNG associated with the client device with the $k_c-1$ seeds.

4. The method of claim 2, wherein the value of $s_{ck_c}$ is equal to 1.

5. The method of claim 1, wherein the matrix $Y_{k_s}$ is computed as:

$$Y_{k_s} = \frac{Y - \sum_{i=1}^{k_s-1} Y_i \cdot s_{si}}{s_{sk_s}}$$

where:
   $Y_i$ is the ith matrix in the set of $k_s$ matrices,
   $s_{si}$ is the ith coefficient in the matrix $S_s$, and
   $s_{sk_s}$ is the $k_s$th coefficient in the matrix $S_s$.

6. The method of claim 5, wherein the value of $s_{ck_s}$ is equal to 1.

7. The method of claim 1, wherein elements of the matrix U are computed as:

$$u_i = Y_i^T \cdot S_c$$

where:
  $u_i$ is the ith element of the matrix U,
  $Y_i^T$ is a transpose of ith matrix in the set of $k_s$ matrices, and
  $S_c$ is a matrix including $k_c$ random coefficients and is generated by the client device.

8. The method of claim 1, wherein the inference value y is computed as:

$$y = \sum_{i=1}^{i=k_s} u_i \cdot s_{s_i}$$

where:
  $u_i$ is the ith element of the matrix U, and
  $s_{s_i}$ is the ith coefficient in the matrix $S_s$.

9. The method of claim 1, wherein the $k_s-1$ random matrices are generated by operating the first CSPRNG associated with the server with the $k_s-1$ seeds.

10. The method of claim 1, wherein the server is further configured to derive a feature from the inference value y.

11. The method of claim 10, wherein the server transmits the derived feature to the client device.

12. A system for Privacy Preserving Inference (PPI) comprising:
  a server comprising:
    one or more processors;
    a non-transitory memory element for storing instructions which, when executed by the one or more processors, configure the server to perform steps for:
      receiving a first set of matrix information from a client device, the first set of matrix information including $k_c-1$ seeds and a matrix $X_{k_c}$, where $k_c$ is an integer value;
      generating $k_c-1$ matrices by operating a first cryptographically secure pseudorandom generators (CSPRNG) associated with the server with the $k_c-1$ seeds and representing the $k_c-1$ matrices and the matrix $X_{k_c}$ as a set of $k_c$ matrices, where the matrix $X_{k_c}$ is the $k_c$th matrix in the set of $k_c$ matrices;
      computing inferences from each of the matrix in the set of $k_c$ matrices and representing the inferences as an inference matrix Y having a first dimension;
      generating a matrix $S_s$, the matrix $S_s$ including $k_s$ random coefficients, where $k_s$ is an integer value;
      generating $k_s-1$ random matrices, each random matrix having same dimensions as that of the inference matrix Y;
      computing a matrix $Y_{k_s}$ in accordance with the inference matrix Y, the matrix $S_s$ and the $k_s-1$ random matrices and representing $k_s-1$ random matrices and the matrix $Y_{k_s}$ as a set of $k_s$ matrices;
      transmitting a second set of matrix information to the client device, the second set of matrix information includes $k_s-1$ seeds corresponding to the $k_s-1$ random matrices and the matrix $Y_{k_s}$, a size of $k_s-1$ seeds being smaller than a size of the $k_s-1$ random matrices and utilizing a smaller transmission bandwidth as compared to bandwidth required to transmit the $k_s-1$ random matrices;
      receiving a matrix U from the client device; and
      computing an inference value y from the matrix U.

13. The system of claim 12, wherein the matrix $X_{k_c}$ is computed by the client device as as:

$$X_{k_c} = \frac{X - \sum_{i=1}^{k_c-1} X_i \cdot s_{ci}}{s_{ck_c}}$$

where:
  X is an input matrix corresponding to a sensitive information selected by the client device,
  $X_i$ is the ith matrix in the set of $k_c$ matrices generated by the client device, the $k_c-1$ matrices in the set of $k_c$ matrices are randomly generated,
  $s_{ci}$ is the ith coefficient in a matrix $S_c$, the matrix $S_c$ including $k_c$ random coefficients is generated by the client device, and
  $s_{ck_c}$ is the $k_c$th coefficient in the matrix $S_c$.

14. The system of claim 13, wherein the $k_c-1$ random matrices are generated by operating a second CSPRNG associated with the client device with the $k_c-1$ seeds.

15. The system of claim 13, wherein the value of $s_{ck_c}$ is equal to 1.

16. The system of claim 12, wherein the matrix $Y_{k_s}$ is computed as:

$$Y_{k_s} = \frac{Y - \sum_{i=1}^{k_s-1} Y_i \cdot s_{si}}{s_{sk_s}}$$

where:
  $Y_i$ is the ith matrix in the set of $k_s$ matrices,
  $s_{si}$ is the ith coefficient in the matrix $S_s$, and
  $s_{sk_s}$ is the $k_s$th coefficient in the matrix $S_s$.

17. The system of claim 16, wherein the value of $s_{ck_s}$ is equal to 1.

18. The system of claim 12, wherein elements of the matrix U are computed as:

$$u_i = Y_i^T \cdot S_c$$

where:
  $u_i$ is the ith element of the matrix U, and
  $Y_i^T$ is a transpose of ith matrix in the set of $k_s$ matrices, and
  $S_c$ is a matrix including $k_c$ random coefficients and is generated by the client device.

19. The system of claim 12, wherein the inference value y is computed as:

$$y = \sum_{i=1}^{i=k_s} u_i \cdot s_{s_i}$$

where:
  $u_i$ is the ith element of the matrix U, and
  $s_{s_i}$ is the ith coefficient in the matrix $S_s$.

20. The system of claim 12, wherein the $k_s-1$ random matrices are generated by operating the first CSPRNG associated with the server with the $k_s-1$ seeds.

* * * * *